G. H. GREENFIELD.
SILO.
APPLICATION FILED DEC. 29, 1910.
1,033,167.
Patented July 23, 1912.
4 SHEETS—SHEET 1.
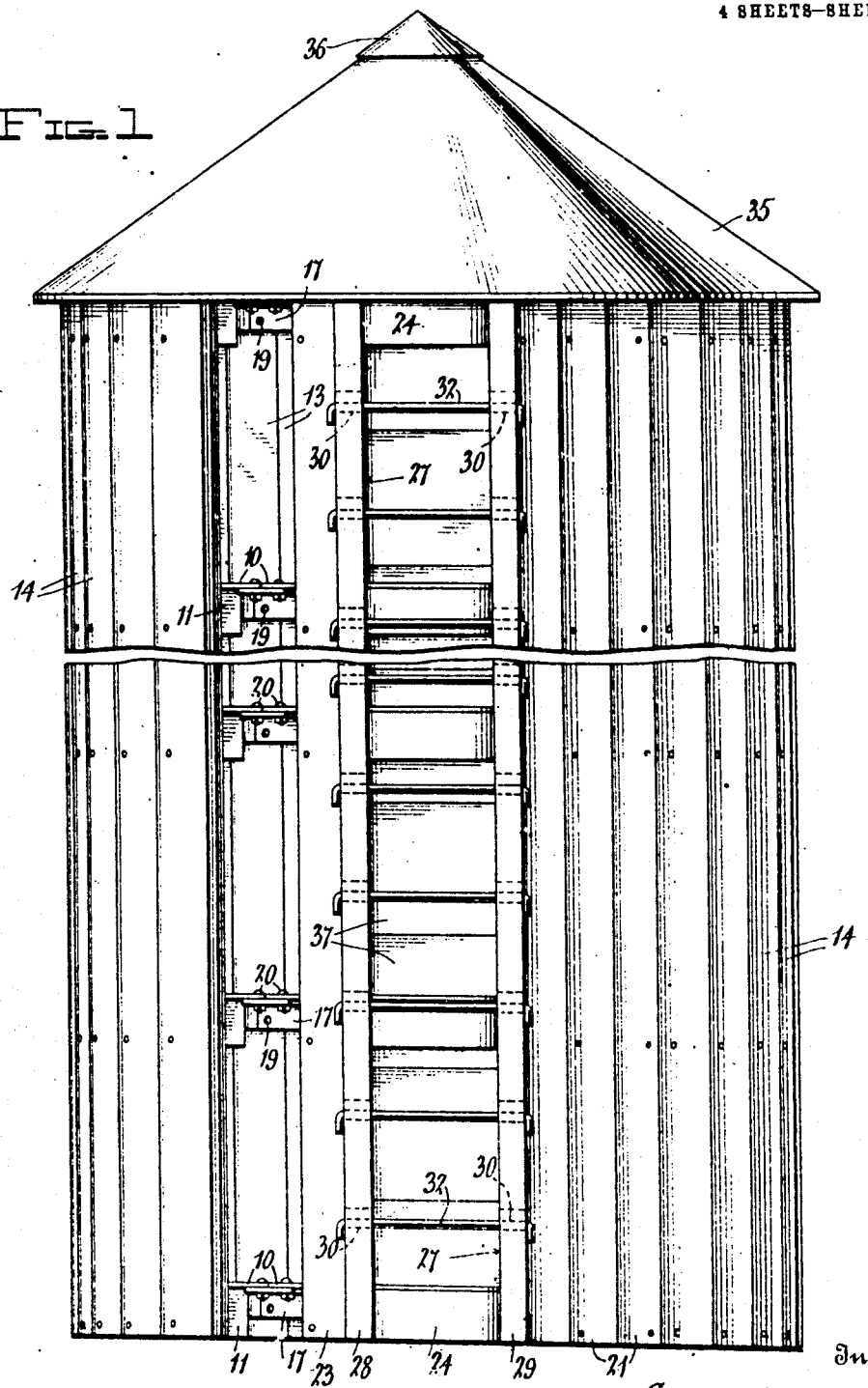

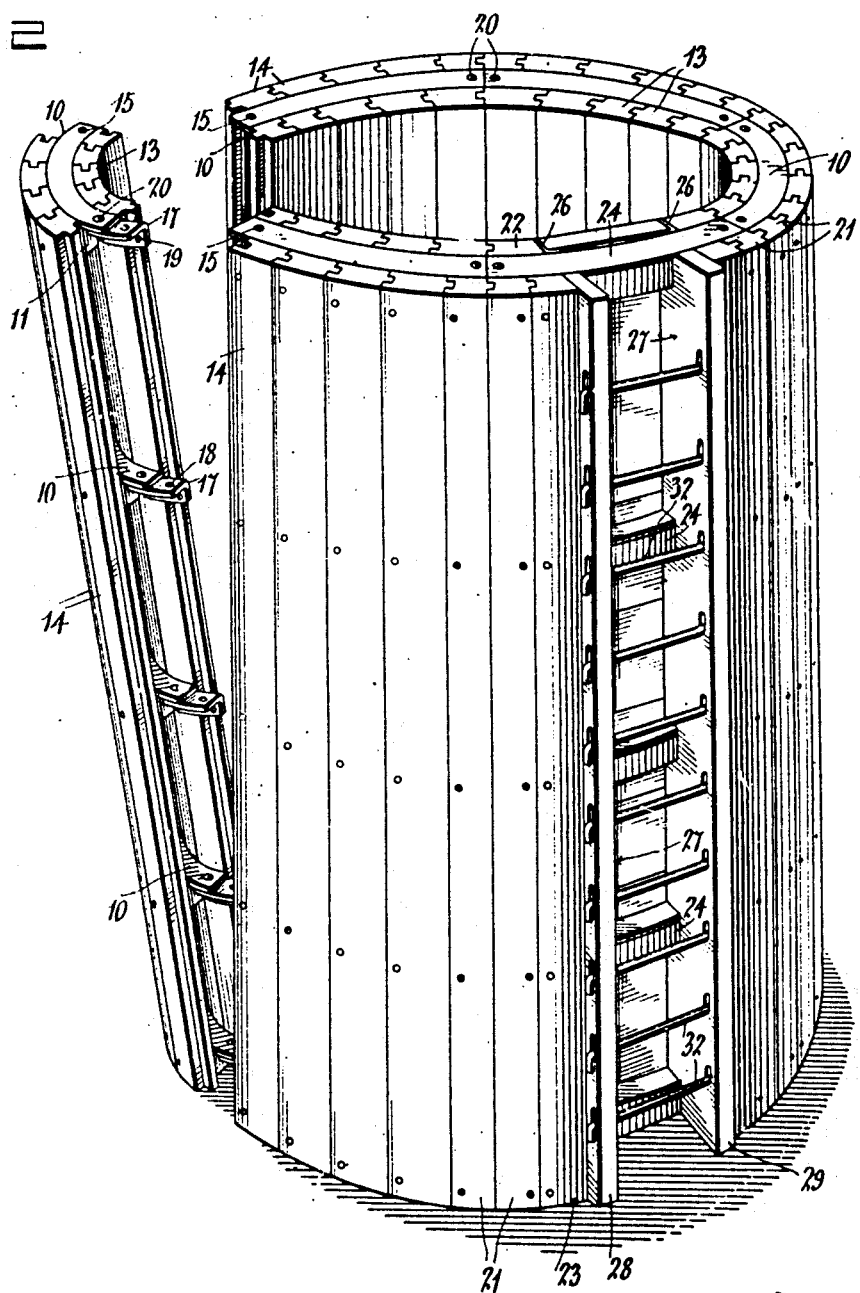

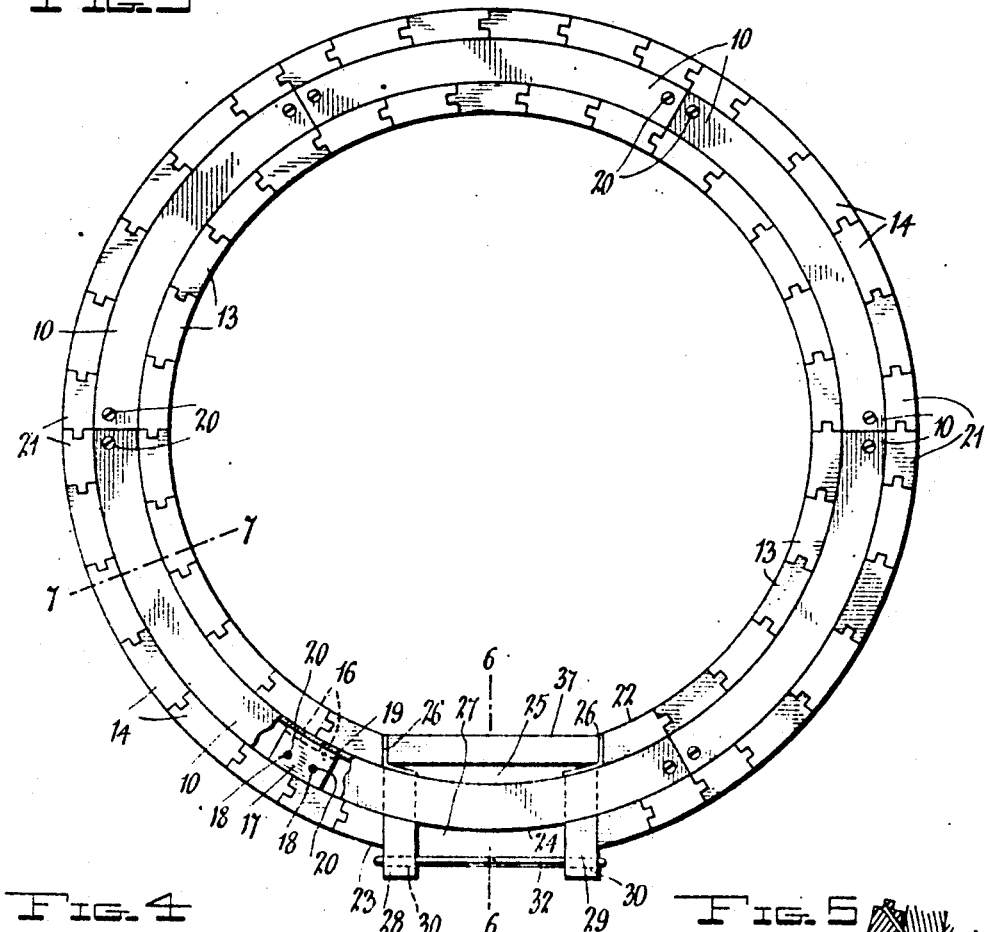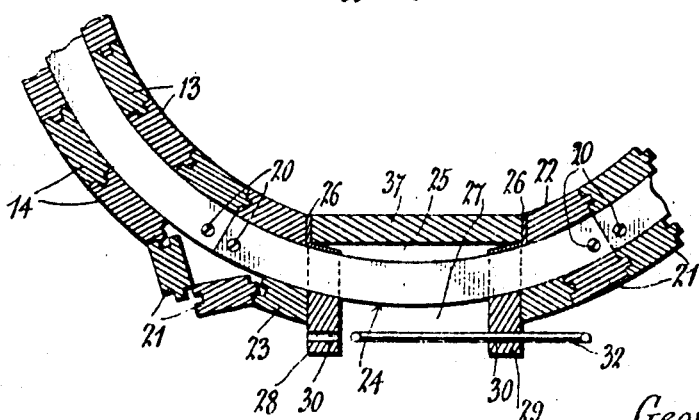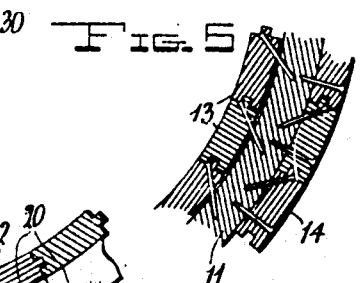

G. H. GREENFIELD.
SILO.
APPLICATION FILED DEC. 29, 1910.
1,033,167.
Patented July 23, 1912.
4 SHEETS—SHEET 4.
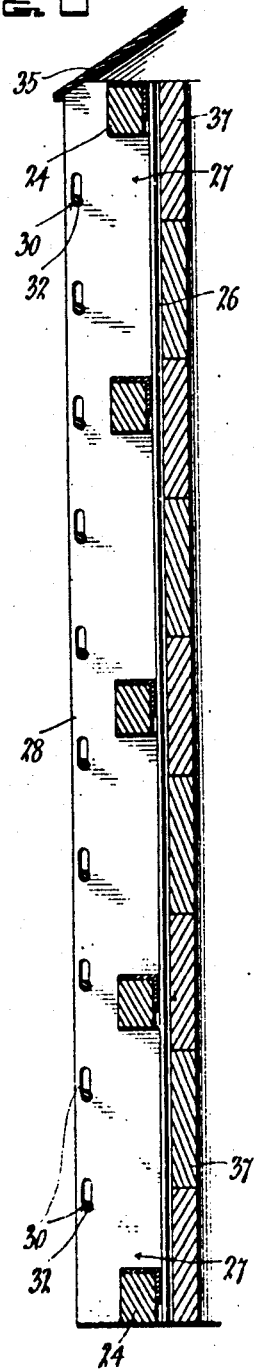
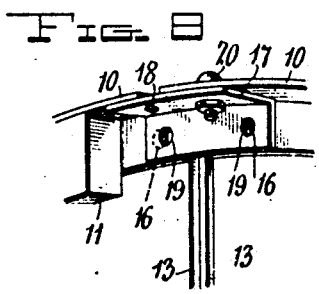
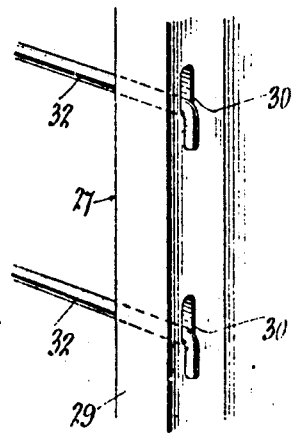
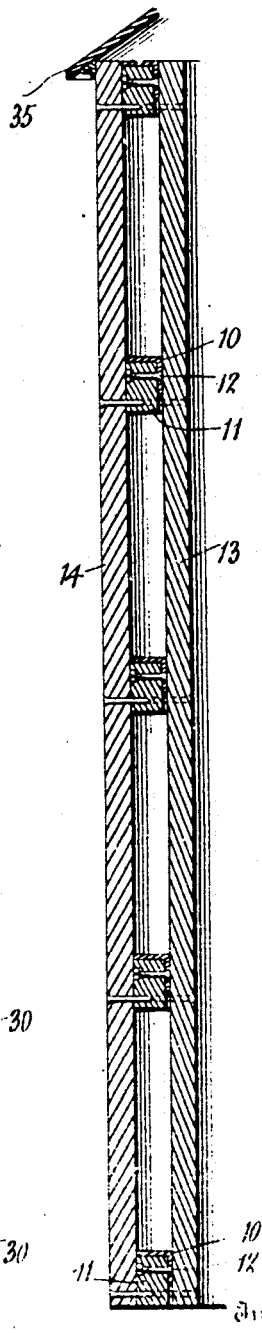
Witnesses
George H. Greenfield
By
Attorneys

UNITED STATES PATENT OFFICE.

GEORGE H. GREENFIELD, OF MORAVIA, NEW YORK.

SILO.

1,033,167.   Specification of Letters Patent.   Patented July 23, 1912.

Application filed December 29, 1910. Serial No. 599,807.

*To all whom it may concern:*

Be it known that I, GEORGE H. GREENFIELD, a citizen of the United States, residing at Moravia, in the county of Cayuga, State of New York, have invented certain new and useful Improvements in Silos; and I do hereby declare the following to be a full, clear, and exact description of the invention, such as will enable others skilled in the art to which it appertains to make and use the same.

This invention relates to silos. It is a well understood fact that silos as now constructed require skilled labor in their erection.

The principal object of the present invention is to provide a silo in which the walls will be constructed in sections which may be readily erected and secured together by the labor commonly found on farms, the silo requiring no scaffolding or the like for its erection.

Another object of the invention is to provide a silo of this character with a novel arrangement of door and ladder so that the ensilage contained in the silo may be easy of access.

With the above and other objects in view, the invention consists in general of a double walled silo constructed in sections, the sections being of novel arrangement and being provided with improved means for securing them edge to edge, the sections further being of such length as to extend the full height of the silo wall when placed in position.

The invention further consists in certain novel details of construction and combinations of parts hereinafter fully described, illustrated in the accompanying drawings, and specifically set forth in the claim.

In the accompanying drawings, like characters of reference indicate like parts in the several views, and:—Figure 1 is a front elevation of a silo constructed in accordance with this invention, the closing planks between two of the sections being omitted. Fig. 2 is a perspective view of a silo of this type, the view showing only the walls and disclosing one section just about to be placed in position for securing to the adjacent sections. Fig. 3 is a top plan view of the silo with the cover removed. Fig. 4 is a transverse sectional view taken in a horizontal plane and disclosing what is termed the ladder section and portions of the two adjacent sections. Fig. 5 is a detail sectional view showing the manner of securing the inner and outer walls or skins to the ribs. Fig. 6 is a sectional view on the line 6—6 of Fig. 3. Fig. 7 is a sectional view on the line 7—7 of Fig. 3. Fig. 8 is a detail view showing the manner of connecting the ribs of adjacent sections. Fig. 9 is a detail perspective view showing certain means to hold the rungs of the ladder in position.

The silo which is constructed in accordance with this invention consists of a series of sections each running from the bottom to the top of the silo wall and these sections vary in number with the size of the silo, there being preferably not less than six as here shown. All of these sections except the single section known as the door or ladder section are precisely alike in construction and dimensions so that a description of the construction of one section will be understood to apply equally to all of the others with the exception above noted. Each of the sections of uniform construction consists of a series of spaced ribs and an inner and outer wall.

Each of the ribs for the various sections of this device is constructed of a piece of angle iron 10 bent to arcuate shape in such manner that one of the legs will be vertical while the other will be horizontal and the length of the angle iron will correspond to the arc of the circle covered by the section. That is to say, if there be six sections the length of each of these angle irons will be one-sixth of a circle corresponding in diameter to the desired diameter of the silo. In the inner angle of each of the angle irons 10 is secured a wooden rib 11, the rib being held to the angle iron by means of spaced bolts 12 which extend through the vertical leg of said angle iron and thus lie horizontally. This wooden rib is of such depth as to extend below the vertical leg of the angle iron as can readily be seen by reference to Figs. 7 and 8 especially. These ribs 11 are preferably made of bent wood and terminate at their ends short of the ends of the angle iron. The various ribs thus constructed are spaced apart from top to bottom of the sections and on the inner or concave side of these ribs are secured inner wall boards 13. The wall boards 13 of each section extend the entire length of the inner flange of the angle iron and are joined by tongue and groove joints and toe-nailed to the various ribs so that no iron is exposed on the inside of the silo sections when erected. The manner of securing these boards will be readily seen by reference to Fig. 5. To the outer peripheries of the ribs are nailed outer wall boards 14 likewise provided with tongue and groove joints and toe-nailed in a manner similar to the inner boards. These outer boards are furthermore provided with other nails for securing means driven perpendicularly into the ribs. This construction will be also apparent by reference to Fig. 5. The outer wall of each section terminates at its edges in spaced relation to the ends of the angle iron members 10. There will thus be left between the sections, when assembled, a series of gaps in the outer walls.

When the sections are erected the tongue and groove joints in the inner walls will form interlocking means at the edges of these walls and spaces will be left through the outer walls for access to the ends of the ribs. The angle irons 10 each have adjacent each end a bolt receiving opening 15 formed in the horizontal leg of each of said angle irons and also are provided with what are preferably termed drift openings 16 similarly positioned in the vertical legs. In order to hold the ends of the angle irons 10 together and thus secure the sections each to each there are provided a series of clips or tie-plates each consisting of a section of angle iron 17 similar to the angle irons 10 and in the horizontal leg of this angle iron are bolt receiving openings 18 while in the vertical leg are drift openings 19. In the assembling of the sections after they are brought up with their edges close together these edges are drawn tightly together by drift pins or bars inserted through the openings 19 and 16, and bolts 20 are then placed through the openings 15 and 18 so as to hold said sections securely together. After the bolts have all been put in position certain closing planks are employed to close up the openings in the outer walls between the different sections of said outer wall. These closing planks and the method of applying them can best be seen by reference to Fig. 4 wherein is shown a pair of planks 21 in position to be forced in between the edges of the outer walls of two of the sections, the manner of using these planks being precisely similar to the well known way in which the last two boards in the ordinary tongue and grooved flooring are forced into position.

Turning now to the section which is termed the door or ladder section. This section is provided, like all of the others, with ribs of the same character and also has an inner and outer wall similar to the inner and outer walls previously described, these walls being indicated at 22 and 23 while the ribs are shown in general at 24. The inner wall 22 has extending from its top to bottom an opening 25 the edges of which are protected by means of wear plates 26 each preferably formed of an angle iron. The outer wall 23 likewise is open from top to bottom as indicated at 27 and the edges of this opening are provided with ladder sides 28 and 29. The sides 28 and 29 are provided with elongated slots 30 the slots in the member 28 being in alinement with the slots in the member 29. Rungs 32 pass through the elongated slots 30, said rungs having their end portions bent at right angles to prevent lateral movement after the same have been placed in position. The rungs can thus be removed from the ladder sides by simply raising the same and passing the bent end portions through the slots 30.

In assembling the silo walls it is preferred that the ladder sections shall first be erected. This may be done by positioning the lower end of this section on the ground at the place where it is intended it shall rest when erected. The upper end may be raised with a block and tackle and braced by suitable struts temporarily nailed to the section. By means of the ladder a person may then ascend to the top of this section and place the block and tackle in position to raise the remaining sections which may, in like manner, be positioned with their lower ends adjacent the section or sections previously raised and lifted by the block and tackle. As each section is raised the same is drawn into position adjacent the previously raised section by means of a suitable drift pin or bar and the bolts inserted. When all of the sections have thus been raised the filling boards or planks 21 are then forced into position and secured to the different ribs either by nailing or, more preferably, by suitable screws, the latter permitting the silo to be taken to pieces for removal to another position if desired. After the walls have been erected in this manner a suitable roof, here indicated at 35 having a ventilator 36, may then be placed over the top. Between the angle irons 26 are placed a series of door boards 37 and it is to be observed that these boards have their ends parallel and that the angle irons 26 are also arranged with two of the legs parallel so that the boards may be readily pushed in or out of said angle irons without raising them to the top. After one or two of the lower boards are placed in position the fodder may then be thrown into the lower part of the silo and as the height of the ensilage increases additional boards may be put in to prevent its falling out of the door opening. It will be obvious that as this process goes on one or more of the ladder rungs may be removed for the purpose of permitting the operators to have access to the interior of the silo without requiring them to crawl through the small space left between the rungs.

After the silo is filled and all the ladder rungs and boards in position access may be had at any time to the interior and the preferred manner of obtaining such access is for the operator to ascend to the top of the ladder, remove the top rung of the ladder and drop the same on the ground. He then knocks in one or more of the upper door boards, turns them endwise and removes them. This gives access to the upper layers of ensilage. As the ensilage is used he removes the next lower rung and places it in the position formerly occupied by the top rung. He then knocks out other boards just below the last and by repeating this process finally arrives at the bottom. The rung previously in the top of the ladder may then be used as the bottom rung and it will be noted that in this manner the ladder is at all times substantially intact, there never being more than one rung out of the ladder at a given time.

It will be observed that by this construction the silo may be built in a shop, transported to the place of erection and set up with the ordinary labor found on a farm, there being no need of scaffolding or any skilled labor. There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claim.

Having thus described the invention, what is claimed as new, is:—

A silo comprising a series of double wall sections, each section including a series of spaced arcuate ribs each consisting of an angle iron having one leg vertical and the other horizontal when erected and a wooden rib bolted to the vertical leg of said angle iron on the inner angle of the angle iron, said wooden rib being bent to conform to said angle iron and being of a depth greater than the vertical leg of said angle iron and a length less than the angle iron whereby the lower parts of the wooden ribs project below the respective angle irons and the ends of the respective ribs terminate short of the ends of the respective angle irons, tongued and grooved planks secured to the concave sides of said ribs and lying side by side the entire length of the ribs to form an inner wall, other tongued and grooved planks secured to the convex sides of the ribs and lying side by side along said ribs to form an outer wall, said outer wall terminating short of the ends of said ribs whereby gaps are left in the outer walls opposite the joints between the sections when the edges of said sections are brought together; in combination with connecting means insertible through the gaps in the outer wall to join the abutting ends of said angle irons, and filling boards to fit in and close the gaps between the sections of the outer wall.

In testimony whereof, I affix my signature, in presence of two witnesses.

GEORGE H. GREENFIELD.

Witnesses:
PHILIP F. LARNER,
M. T. MILLER.